(12) United States Patent
Gould

(10) Patent No.: US 7,653,704 B2
(45) Date of Patent: *Jan. 26, 2010

(54) SYSTEM, METHOD, AND ARTICLE OF MANUFACTURE FOR SEAMLESS INTEGRATED SEARCHING

(76) Inventor: Eric J. Gould, 611 S. Congress Ave., Suite 310, Austin, TX (US) 78704

( * ) Notice: Subject to any disclaimer, the term of this patent is extended or adjusted under 35 U.S.C. 154(b) by 0 days.

This patent is subject to a terminal disclaimer.

(21) Appl. No.: 10/635,880

(22) Filed: Aug. 5, 2003

(65) Prior Publication Data

US 2004/0030675 A1  Feb. 12, 2004

Related U.S. Application Data

(63) Continuation of application No. 09/534,912, filed on Mar. 23, 2000, now Pat. No. 6,633,903.

(51) Int. Cl.
G06F 17/30 (2006.01)
(52) U.S. Cl. .................. 709/218; 709/245; 707/200
(58) Field of Classification Search ........... 709/205, 709/218, 219, 245; 345/716, 748; 707/3, 707/203, 200
See application file for complete search history.

(56) References Cited

U.S. PATENT DOCUMENTS

| 5,202,828 | A | | 4/1993 | Vertelney et al. |
| 5,222,234 | A | * | 6/1993 | Wang et al. ............ 707/3 |
| 5,341,293 | A | | 8/1994 | Vertelney et al. |
| 5,408,655 | A | | 4/1995 | Oren et al. |
| 5,410,692 | A | | 4/1995 | Torres |
| 5,504,852 | A | * | 4/1996 | Thompson-Rohrlich .... 715/835 |
| 5,608,900 | A | | 3/1997 | Dockter et al. |
| 5,630,117 | A | | 5/1997 | Oren et al. |
| 5,701,469 | A | | 12/1997 | Brandli et al. |
| 5,778,361 | A | | 7/1998 | Nanjo et al. |
| 5,781,904 | A | | 7/1998 | Oren et al. |
| 5,815,703 | A | | 9/1998 | Copeland et al. |
| 5,819,273 | A | * | 10/1998 | Vora et al. .................. 707/10 |

(Continued)

FOREIGN PATENT DOCUMENTS

EP  0322123 A2  6/1989

(Continued)

OTHER PUBLICATIONS

Vahdat, A. et al.,"Transparent Result Caching", Proceedings of USENIX 1998, pp. 25-37, Jun. 1998.*

(Continued)

*Primary Examiner*—Patrice Winder

(57) ABSTRACT

A search system (10) employing a scheme of meta-folders (14) in which conventional objects (18) and search objects (20) may be stored in an intermingling manner. Upon opening a meta-folder (14) the search objects (20) are resolved into conventional static pointers, and thus into conventional objects (18). Optionally, an unresolved meta-folder (14*a*) may very fleetingly appear while this occurs. A resolved meta-folder (14*a*) then results, presenting only conventional objects (18). In particular, the search objects (20) may be search criteria which the process of resolving causes to produce only such searched out conventional objects (18) which are currently available. Users (80) of the search system (10) my employ it in large network environments (82), including the Internet (96).

60 Claims, 6 Drawing Sheets

U.S. PATENT DOCUMENTS

| | | | |
|---|---|---|---|
| 5,845,067 A | 12/1998 | Porter et al. | |
| 5,845,289 A | 12/1998 | Baumeister et al. | |
| 5,870,710 A * | 2/1999 | Ozawa et al. | 704/500 |
| 5,900,870 A | 5/1999 | Malone et al. | |
| 5,903,892 A * | 5/1999 | Hoffert et al. | 707/10 |
| 5,924,090 A | 7/1999 | Krellenstein | |
| 5,963,916 A * | 10/1999 | Kaplan | 705/26 |
| 5,987,471 A | 11/1999 | Bodine et al. | |
| 6,003,040 A | 12/1999 | Mital et al. | |
| 6,023,708 A | 2/2000 | Mendez et al. | |
| 6,088,717 A * | 7/2000 | Reed et al. | 709/201 |
| 6,151,643 A * | 11/2000 | Cheng et al. | 710/36 |
| 6,173,289 B1 | 1/2001 | Sonderegger et al. | |
| 6,216,122 B1 | 4/2001 | Elson | |
| 6,233,571 B1 * | 5/2001 | Egger et al. | 707/2 |
| 6,233,682 B1 * | 5/2001 | Fritsch | 713/168 |
| 6,324,587 B1 * | 11/2001 | Trenbeath et al. | 709/206 |
| 6,353,823 B1 | 3/2002 | Kumar | |
| 6,421,656 B1 * | 7/2002 | Cheng et al. | 707/2 |
| 6,446,080 B1 * | 9/2002 | Van Ryzin et al. | 707/104.1 |
| 6,484,190 B1 | 11/2002 | Cordes et al. | |
| 6,516,329 B1 * | 2/2003 | Smith | 715/501.1 |
| 6,546,393 B1 * | 4/2003 | Khan | 707/10 |
| 6,587,835 B1 * | 7/2003 | Treyz et al. | 705/14 |
| 6,615,248 B1 * | 9/2003 | Smith | 709/217 |
| 6,628,306 B1 | 9/2003 | Marchionda | |
| 6,633,903 B1 * | 10/2003 | Gould | 709/205 |
| 6,693,236 B1 * | 2/2004 | Gould et al. | 84/477 R |
| 7,039,647 B2 | 5/2006 | Lowe et al. | |
| 7,287,018 B2 | 10/2007 | Lennon | |
| 2003/0208473 A1 * | 11/2003 | Lennon | 707/3 |
| 2004/0030675 A1 * | 2/2004 | Could | 707/1 |
| 2007/0061416 A1 | 3/2007 | Gould | |

FOREIGN PATENT DOCUMENTS

| | | |
|---|---|---|
| EP | 0622743 A2 | 11/1994 |
| EP | 0625757 A1 | 11/1994 |
| EP | 0694857 A1 | 1/1996 |
| WO | 01/67300 | 9/2001 |

OTHER PUBLICATIONS

Wold, E. et al.,"Content-based classification, search and retrieval of audio", IEEE Multimedia, v 3, n 3, p. 27-36, Nov. 1996.*

Xu-Y-Y et al.,"A WWW-based intelligent multimedia information query and retrieve system", IEEE Intern. Conf. on Multimedia and Expo, v 2, p. 731-734, Aug. 2000.*

Catapult, Inc., "Microsoft Outlook 98 Self-Study Kit," Microsoft Press, 1998.

Callahan, Evan, "Microsoft Access 97 Visual Basic Developer's Self-Study Kit," Microsoft Press, 1997.

Hacker, Scott, "The BeOS Bible," Peachpit Press, 1999.

Bouguettaya et al., "WebFindIt: An Architecture and System for Querying Web Databases", IEEE Internet Computing, pp. 30-41, Aug. 1999.

Ro et al., "Remote Method Invocation Based Web Database System for Global Environment Models", IEEE Inter. Conf. on Systems, Man, and Cybernetics, vol. 6, pp. 563-568, Oct. 1999.

"Sherlock 2", http://www.imac/com/sherlock/, Nov. 22, 1999.

Office Action of Oct. 1, 2008 in U.S. Appl. No. 11/512,904, 17 pages.

* cited by examiner

SYSTEM, METHOD, AND ARTICLE OF MANUFACTURE FOR SEAMLESS INTEGRATED SEARCHING

This is a continuation of application Ser. No. 09/534,912, now issued as U.S. Pat. No. 6,633,903 B1, filed on Mar. 23, 2000, the disclosure of which is incorporated herein by reference.

TECHNICAL FIELD

The present invention relates generally to retrieving data stored in computer files and database structures, and more particularly to searching for such data which meets particular criteria.

BACKGROUND ART

As our society increasingly comes to rely on complicated electronic systems, and particularly on such systems which have the ability to inter communicate, finding specific objects within these systems is becoming an increasingly daunting task. Today we widely use computer systems, including personal computers, network computers, and still large computer systems such as terminal accessed mainframes. We also are increasingly using enhanced electronic devices which are often portable. Some examples include audio players, personal digital assistants, and telephones able to access some Internet content. The distinction between computers and other devices is becoming a largely irrelevant one. But all of this is exacerbating one already existing problem, how to find what we want in the complex and expanding networks which are now accessible to us.

Existing computer systems serve well to illustrate both the problem and the existing approaches to dealing with it. The personal computer (PC) has been available for roughly twenty years now. Very early PCs had only limited storage capability, typically on removable floppy disk or cassette tape media. However, since file sizes were small then, and many files might be stored on a single media unit, file name type search utilities were soon developed. These, however, did not always suffice, and rudimentary file content type search utilities also were soon.

A major advance for PCs was the fixed disk drive, or as it more commonly became known: the hard drive. Initial PC hard drives could store ten megabytes, which exacerbated the problem of searching for files and their contents. That advent of much larger hard drives, able to store even gigabytes, exacerbated the existing problems but did not substantially change their nature.

The major relevant advance for PCs was the computer network, and this did substantially change the nature of the problem. On larger networks, we might now also have to search for computers, just to if they existed or were currently on-line. We might also try to search out computer users, particularly in networks were multiple users might employ a single computer, say, via multiple terminals. Network messaging systems soon followed, and to databases of contact information were created to assist in finding and communicating with people.

From small, local networks we progressed to wide area networks, and today we have global networks such as the Internet. And from simple file name and content searches we now have a huge variety of objects that we regularly must search for. For instance, we may search the contents, names, and subjects of files; we may search for storage devices, computers, or even sub-networks of computers; we may also search databases spread across all of these; and this is just a very limited statement of what one might search for.

Continuing with the example of PCs, the most widely used operating system in such today is WINDOWS (trademark of Microsoft Corporation of Redmond, Wash.). WINDOWS provides a graphical user interface (GUI) to its users. FIG. 1 (background art) presents and example a of the WINDOWS GUI showing a conventional window 1 having information bars 2 (e.g., for title and status), control bars 3 (e.g., for menus and buttons), and a main area 4. The main area 4 includes icons 5 representing static pointers to conventional objects 6. A folder object 6a and various file objects 6b are present.

WINDOWS includes a number of search features, and one current version provides menu choices to find: "Files or Folders . . . ," "Computers . . .," People . . . ," objects "On the Internet . . . ," and this menu is extensible to include find choices specific to applications as well.

This is not sufficient, however, and utility programs abound that provide "enhanced" search capability for use within the PC and outside of it on networks. In fact, in the large publicly accessible network called the Internet a whole service industry has grown around finding objects. Some Internet sites provide search capability to only search their own databases, for example, to facilitate PC users shopping. Other Internet sites provide search capability that extends to objects, i.e., data, which is essentially anywhere on the Internet.

The prior art in both locally originated search systems and remote search systems have limitations. For a locally originating system the example of WINDOWS will again be used. But this is not to denigrate it; many of the same points apply for MAC OS and search utilities in it such as SHERLOCK (trademarks of Apple Computer Inc. of Cupertino, Calif.).

In WINDOWS a search must be pre-created, using a complex criteria based approach. This requires a sophisticated computer user, and many WINDOWS users never employ its search capabilities. Once a search is created, it can be stored. But reopening it merely opens the utility with the old search criteria displayed. If a user wants to conduct the same search as before, this requires a command to proceed.

In WINDOWS searching is actually limited to files and folders in its own network location protocol or in universal naming convention (UNC) protocol. It cannot also directly search http, ftp, etc. protocols. For example, to the extent that it indirectly supports http, it opens a browser application set to its default search engine (e.g., LYCOS by Lycos Inc. of Williamstown, Mass.), and the user is then left to specify appropriate criteria there.

And as such search engines currently exist, these criteria are generally not storable for reuse. While some such search engines send the search criteria in a universal resource locator (URL) getting a copy of that URL and storing it is not easily done, and once such is stored, reviewing and editing such requires very high level familiarity with HTML, XML, etc. protocols. For example, online stores such as Amazon.com allowing saving of personal profiles for preferred categories or automatic filtering according to past purchases, but this is limited to a single profile per user login and fail to provide selectable differentiation on a plurality of distinct foci.

WINDOWS includes a separate find computer function, but that does not automatically further extend to finding files and folders on a found computer. And its find people function merely extends to searching its contact lists and address books in applications with which it is closely associated.

Another concern is how to accommodate the need for searching in emerging user interfaces, which will herein be termed XUI (for extended or alternate). Visual GUI are useful in many contexts, but not in all. Interface designers today are increasingly turning to audio and tactile interfaces as well. This is particularly the case with enhanced devices, where the term "audible icon" is now used. For example, MP3 format music players and wireless web-enabled devices are increasingly common, and it is only a matter of time before combination devices are marketed which permit users to download MP3 music selections for their enjoyment. But such devices should not have to rely on only visual GUIs. Indeed, it is already appreciated, at least among some segments of the interface design community, that such are stereotypical and limiting, and that audible XUIs are appropriate for audible subject matter.

Accordingly, what is needed now is an improved search system. Such an improved search system should preferably work in conventional computer GUIs, such as WINDOWS and MAC OS, as well as in GUIs and XUIs used by web sites, web applications and enhanced electronic devices. Such an improved search system should also integrate the separate capabilities of existing search systems as well as new capabilities, yet remain simple enough that relatively unsophisticated users may still employ it.

DISCLOSURE OF INVENTION

Accordingly, it is an object of the present invention to provide a system for seamless integrated searching for objects within storage systems, including those of computers, enhanced electronic devices, and networked collections of such.

Another object of the invention is to provide a system for searching that integrates well with existing and emerging graphical and extended user interfaces (GUIs and XUIs), and thereby enhance the capabilities and utility of such.

Another object of the invention is to provide a system for searching permitting complex searches to be easily created, tested, and edited.

And, another object of the invention is to provide a system for searching which is powerful in an extensible manner, permitting sub-searches to be combined to create more powerful overall searches.

Briefly, one preferred embodiment of the present invention is a system for searching for and presenting collections of conventional objects. The search system includes a computerized system having a controllable display and a selection unit influencing what is depictable with that display. The computerized system may be a single computerized device or a networked collection of various computerized devices, and the display need not necessarily be a visual type of display. Also included in the search system is a meta-folder containing at least one search object which is suitable for locating current instances of the conventional objects currently present in the computerized system. A closed representation of said meta-folder is depictable on the display, and once that closed representation is selected and opened with the selection unit it can become an open representation of the meta-folder which includes representations of the current instances of the conventional objects.

Embodiments may be implemented in a computer program embodied on a computer readable medium. For instance, a computer program embodied on a computer readable medium is contemplated for searching for and presenting collections of conventional objects in a computer system. The computer program may comprise a code segment that depicts a meta-folder within a display as a closed representation, wherein the meta-folder contains at least one previously defined search object, and a code segment that selects and opens the meta-folder. The computer program may further comprise a code segment that resolves the search objects in the meta folder into current instances of the conventional objects which are findable in a computerized system, and a code segment that depicts an open representation of the meta-folder within the display which includes the current instances of the conventional objects which are thus found. The meta-folder may be provided as a file, and the computer program may further comprise a code segment that transfers the file from a storage medium into the computerized system. The computerized system may include a network, a client device which is connectable to the network, and a server which is connected to the network. The meta-folder may be stored on the server, and the computer program may further comprise a code segment that connects the client device to the server via said network, and a code segment that accesses the meta-folder on the server via the network.

An advantage of the present invention is that it may be employed with a very broad spectrum of possible devices and to access a very broad spectrum of possible storage systems.

Another advantage of the invention is that it may integrate into existing and emerging GUIs and XUIs in a manners which may make it appear a natural extension of the underlying user interface, and which therefore make use the invention highly intuitive to users of such GUIs and XUIs.

And, another advantage of the invention is that it may be employed in a substantially visual manner, largely using click-to-open and drag-and-drop types of operations, thus making it efficient yet simple to use.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 3a-b stylistically depict search objects from the meta-folder FIG. 2 as the contents of the search objects were each alone in an opened meta-folder and had been resolved, wherein FIG. 3a depicts the first search object according to one common GUI window presentation scheme and FIG. 3b depicts the second search object according another common GlJI scheme;

BEST MODE FOR CARRYING OUT THE INVENTION

Figure 1:
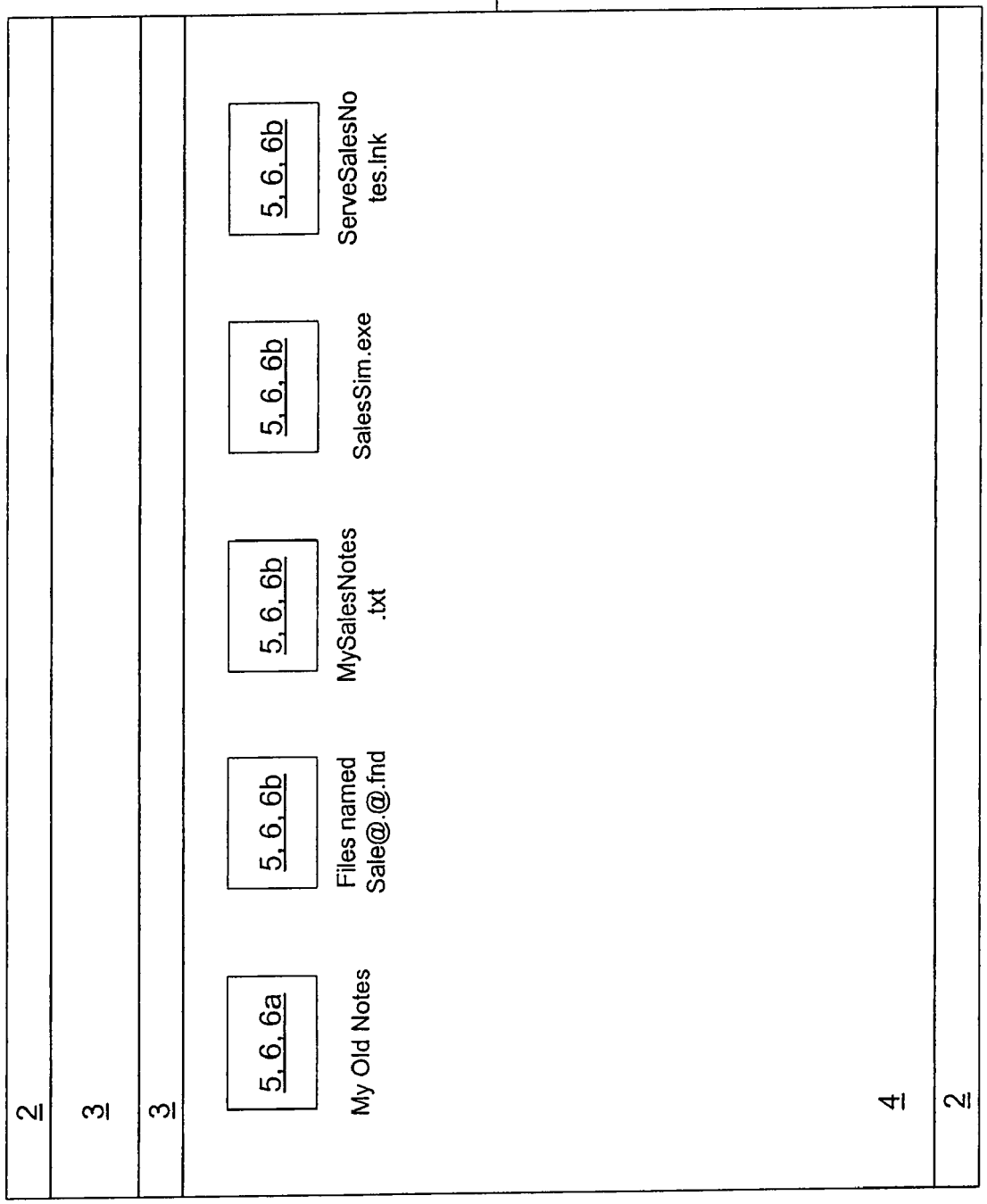
FIG. 1 (background art) depicts a computer graphical user interface showing a conventional window and icons in it representing conventional objects.

A preferred embodiment of the present invention is a system for seamless integrated searching. As illustrated in the various drawings herein, and particularly in the view of FIG. 2, a form of this preferred embodiment of the inventive device is depicted by the general reference character 10.

Figure 2:
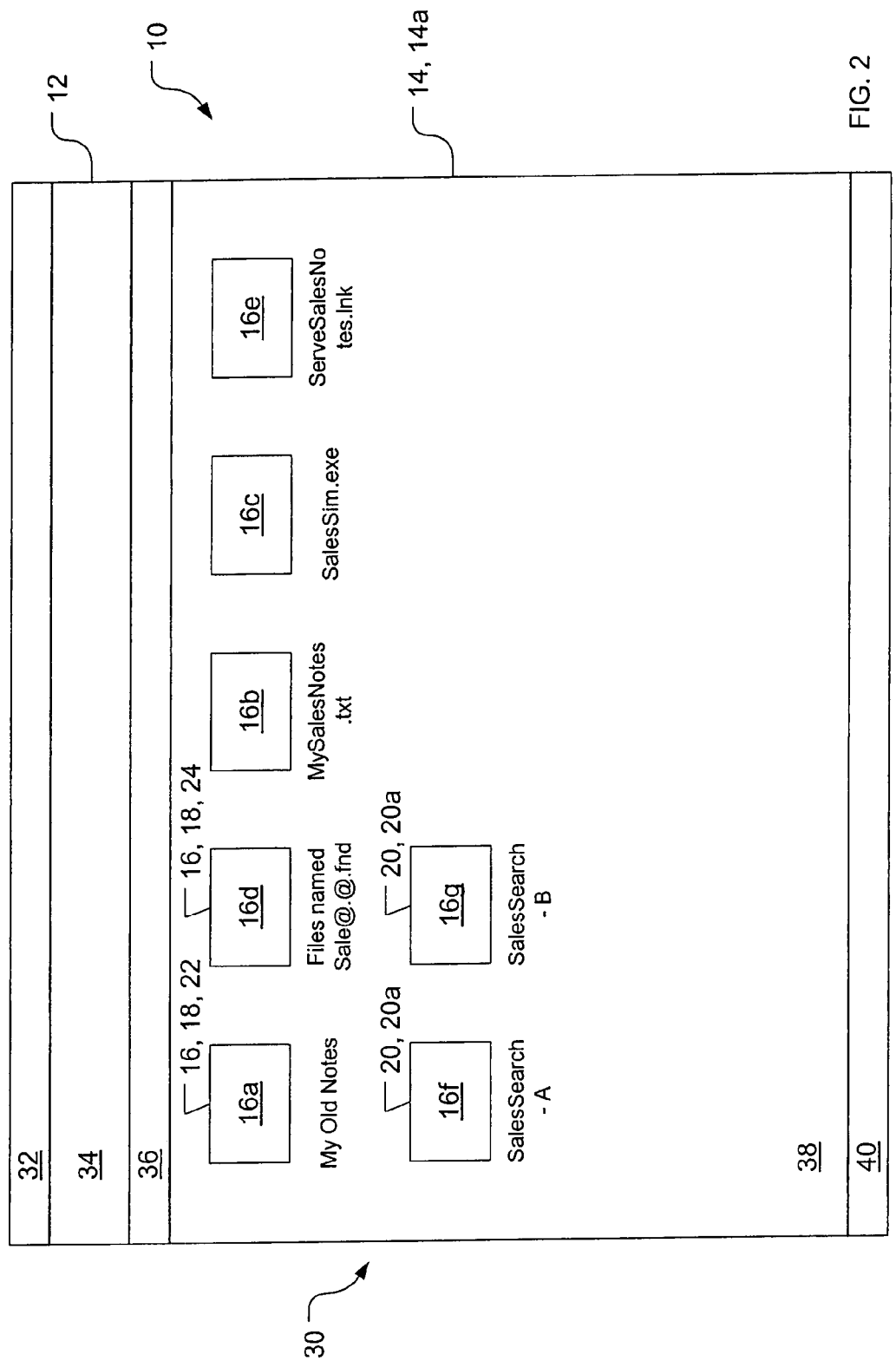
FIG. 2 stylistically depicts a graphical user interface including a unresolved meta-folder on the display of a computer system, according to one embodiment of the present invention.

FIG. 2 stylistically depicts the search system 10 presenting a graphical user interface (GUI 12) on the display of a computer system (not otherwise shown). The key visual element seen by a user is a meta-folder 14, which is so termed to emphasize its distinctness from conventional GUI windows and folders. Specifically, FIG. 2 depicts an unresolved meta-folder 14a (resolved meta-folders are discussed presently).

When opened, the unresolved meta-folder 14a of FIG. 2 includes icons 16 representing various conventional objects 18 and search objects 20. As can readily be seen in comparison with FIG. 1 (background art), the search system 10 of this embodiment at this stage outwardly appears quite similar in many respects to conventional computer GUIs. This stage is typically a very fleeting one, however, since resolving the search objects 20 usually proceeds automatically once a meta-folder 14 is opened (a menu option to view unresolved is discussed presently). The search objects 20 may be local objects, or present on local networks, on wide-area networks, or even on global networks like the Internet. Depending upon the underlying computer system and the connection times needed to resolve the search objects 20, an unresolved meta-folder 14a might be suppressed and not be presented at all, or may appear but only for a few micro-seconds to a few seconds.

Figure 3:
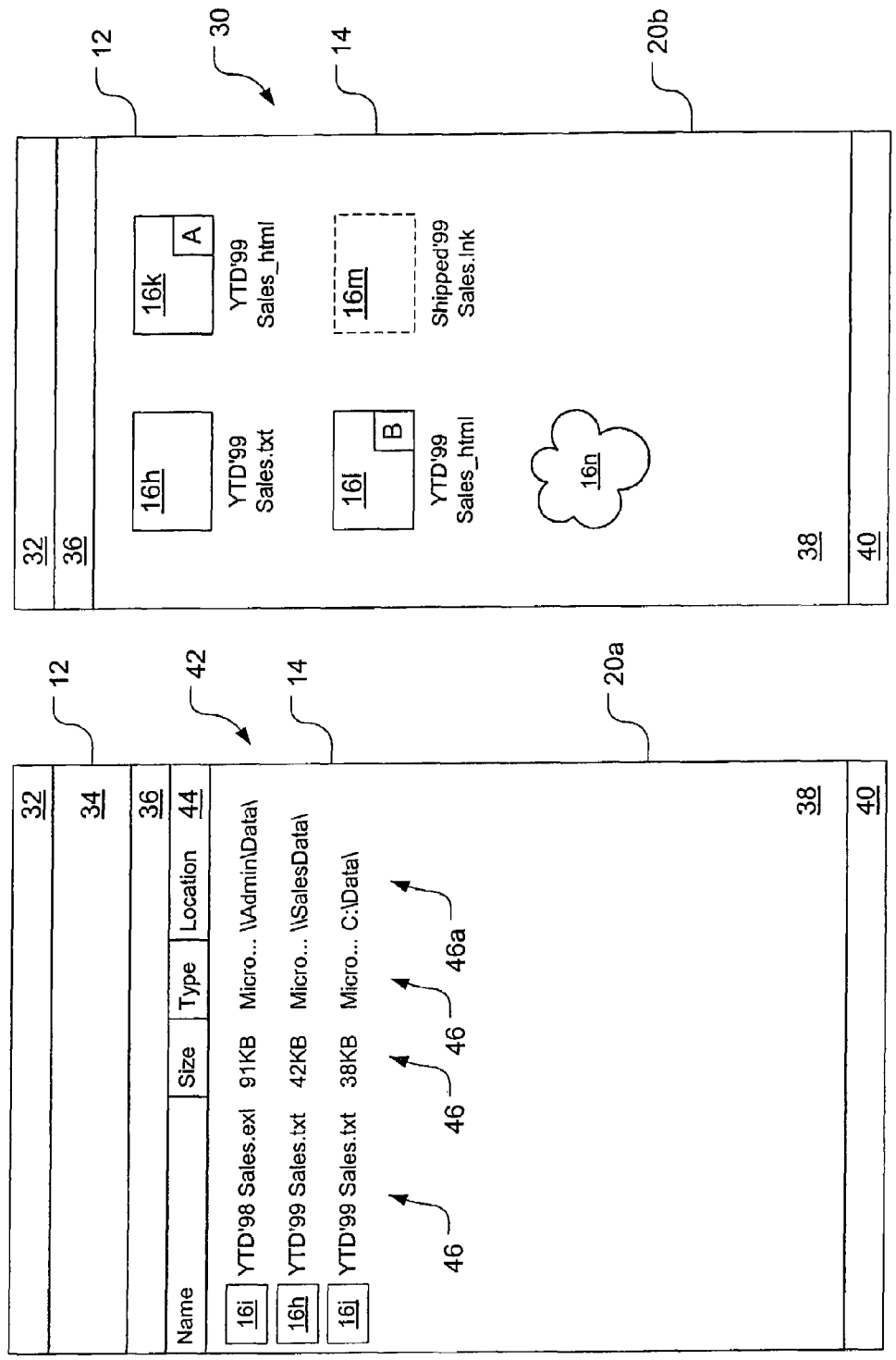
Figure 4:
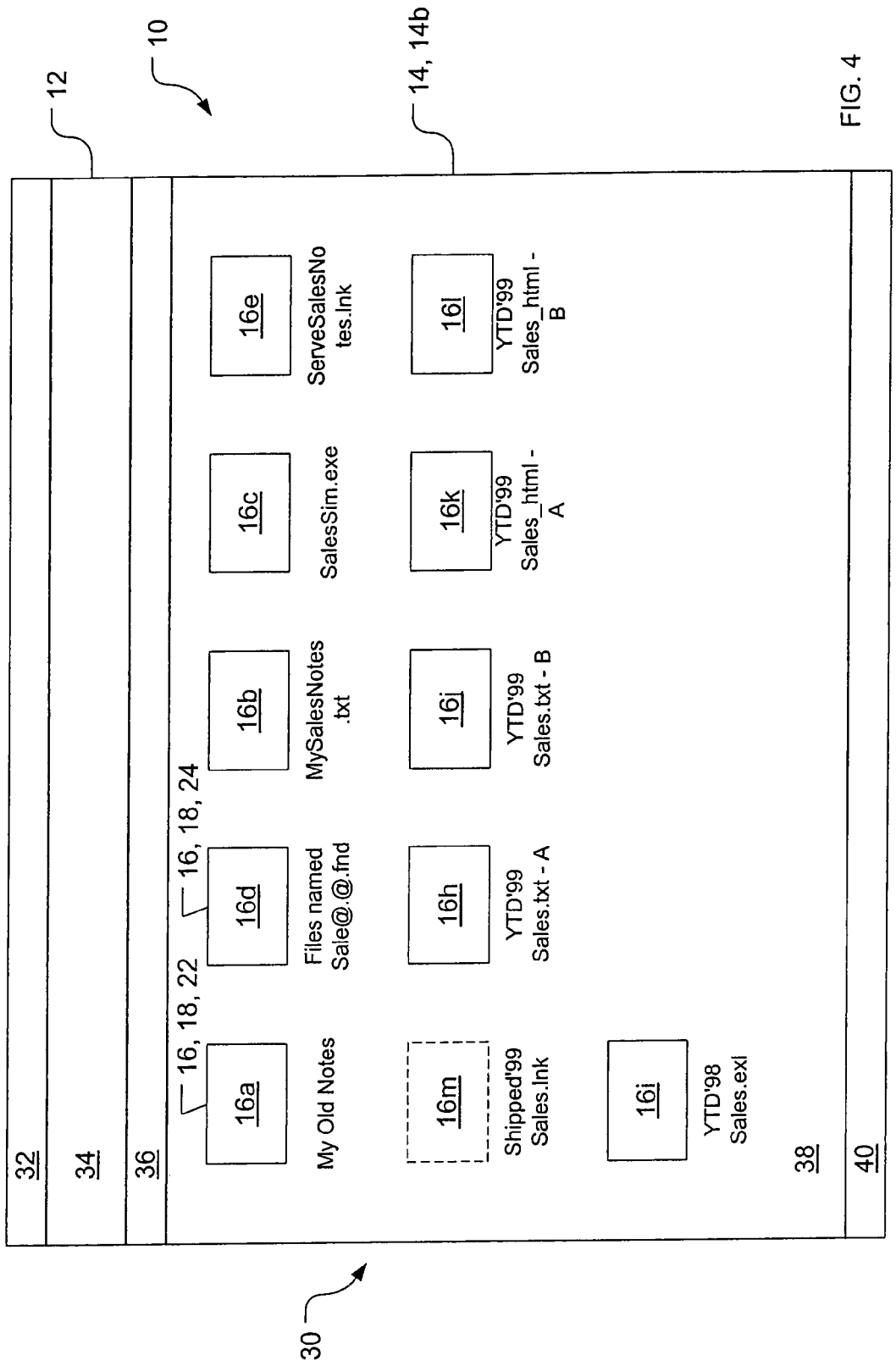
FIG. 4 depicts the unresolved meta-folder of FIG. 2 and the search objects therein once they have collectively been resolved into a resolved meta-folder.

The conventional objects 18 in a meta-folder 14 are so termed because they are conventional static pointers to other objects. Such conventional objects 18 may point to conventional folders 22 (also widely referred to as directories) or to conventional files 24, as is very common today in widely used GUIs such as WINDOWS (trademark of Microsoft Corporation of Redmond, Wash.) or MAC OS (trademark of Apple Computer Inc. of Cupertino, Calif.). [FIG. 2-4 are loosely based on the WINDOWS GUI.] There is considerable variety of file types in such operating systems, and it should particularly be appreciated that complex file types, like *.lnk and *.fnd files, can be handled by the search system 10. In fact, the conventional objects 18 can even, in somewhat recursive manner, include *.lnk files pointing to other meta-folders 14.

For use as examples in the present discussion, FIG. 2 includes an icon 16a representing a sub-folder object, named "My Old Notes"; an icon 16b representing a text file, named "MySalesNotes.txt"; an icon 16c representing an executable file, named "SaleSim.exe"; an icon 16d representing a find file, named "Files named Sales@.@.fnd"; and an icon 16e representing a link file, named "ServerSalesNotes.lnk." All of the suffixes are included here to avoid confusion, but operating systems such as WINDOWS typically hide some suffixes, e.g., "lnk" suffixes.

FIG. 2 also includes an icon 16f representing an unresolved first search object 20a, named "Sales Search," and an icon 16g representing an unresolved second search object 20b, also named "Sales Search," but different (as will be described presently). The search objects 20 are not conventional, and they should not be confused with the conventional objects 18, which are merely static pointers to other objects. The search objects 20, in concert with the action of opening the meta-folders 14 containing them, operate automatically to attempt to resolve the search objects 20 into conventional objects 18. FIGS. 2, 3a-b and 4 collectively illustrate this by example.

The search objects 20 are collections of search criteria. A search object 20 may contain as little as one explicit criteria, such as "C:\Data\YTD'99 Sales.txt," which at search time may resolve into one specific conventional object 18 (or even nothing, if that named file is not in the stated location at search time). Or a search object 20 may contain a number of criteria, both explicit and implicit. For example, search object 20 might contain three such search criteria: "*\*\*'99 Sales.*; C:\Data\YTD'99 Sales.txt; http://*DBServer.Acme.com/*'9?_Sales.html." By employing wildcard characters, this search object 20 may resolve the implicit first and last search criteria into a large number of conventional objects 18 at search time, but it will at most resolve the explicit center criteria into at most one conventional file on the local system where it is resolved (search objects can be highly portable, as discussed presently). Here, and below, WINDOWS GUI type search criteria conventions are used for example. Those skilled in the computer arts will readily appreciate that search criteria can be defined in many ways other than using "*" and "?" as wildcard characters and ";" as a concatenation command.

FIG. 3a stylistically depicts the contents of the first search object 20a as if it were alone in an opened meta-folder 14 and had been resolved as fully as possible. Assuming that the first search object 20a had been based on a search criteria of "*\Data\YTD'?? Sales.*," it will contain icons 16 representing all of the various objects which are conceptually "in" it. In FIG. 3a these include an icon 16h representing a file named "\\Admin\Data\YTD'99 Sales.txt"; an icon 16i representing a file named "\\SalesDept\Data\YTD'98 Sales.exl"; and an icon 16j representing a file named "C:\Data\YTD'99 Sales.txt". As can be seen, mapped local folders and universal naming convention (UNC; used widely in networks) may be used and these files may effectively be anywhere within the computer system.

In a much similar manner, FIG. 3b stylistically depicts the contents of the second search object 20b as if it were alone in an opened meta-folder 14 and had been resolved as fully as possible. The second search object 20b will contain icons 16 representing all of the various objects which are conceptually "in" it. Assuming that it was based on a compound search criteria of "*\*\*'99 Sales.*; http://*DBServer.Acme.com/*'9?_Sales.html," it here includes an icon 16h representing the file named "\\Admin\My Docs\YTD'99 Sales.txt" again; an icon 16k representing a file named "http://DBServerDenver.Acme.com/YTD'99_Sales.html"; and an icon 16l representing a file named "http://DBServerSeattle.Acme.com/MTD'3'99_Sales.html." FIG. 3b further includes an icon 16m representing a currently unresolvable pointer to a file named "D:\Archive\Shipped'99 Sales.lnk." This icon 16m is shown in ghost form to symbolize that the conventional *.lnk file here is defined, but that the which object it points to is not currently accessible. For instance, in this hypothetical scenario the location "D:\Archive" may be obsolete or offline, say, if it is in a removable media. Whether the search system 10 goes beyond resolving search objects 20 and tries to also resolve conventional links is an optional feature.

FIG. 4 shows the unresolved meta-folder 14a of FIG. 2 and the search objects 20a and 20b of FIG. 3a-b once they have been resolved into a resolved meta-folder 14b. Since the resolved meta-folder 14b is resolved, it appears to contain only conventional objects 18. The icon 16a for the "My Old Notes" folder is present; the icon 16b for the "MySales-Notes.txt" file is present; the icon 16c for the "SaleSim.exe" file is present; the icon 16d for the "Files named Sales@.@.fnd" file is present; the icon 16e for the "Server-SalesNotes.lnk" file is present; the icon 16h for the "\\Admin\Data\YTD'99 Sales.txt" file is present; the icon 16i for the "\\SalesDept\Data\YTD'99 Sales.exl" file is present; the icon 16j for the "C:\Data\YTD'98 Sales.txt" file is present; the icon 16k for the "http://SeattleDBServer.Acme.com/YTD'99_Sales.html" file is present; an icon 16l for the "http://DenverDBServer.Acme.com/MTD'3'99_Sales.html" file is present; and the icon 16m is present (again in ghost form) for the "\\Shipping\Archive\Shipped'99 Sales.lnk." file.

The icons 16f and 16g are notably not present, since they have been fully resolved. A second instance of the icon 16h is also not present in this embodiment. An alternate embodiment might, however, redundantly present icon 16h twice or enlarged icon 16h or otherwise modify the representation, say, to emphasize that it may be particularly important under the criteria used for the particular search objects 20a and 20b.

As previously noted FIG. 2-4 loosely conform to the WINDOWS GUI. This bears further discussion, since implementing the search system 10 in a particular GUIs may raise various design issues. This is less of an issue when designing for a web-based system such as an e-commerce site and resides in a browser window, because the browser provides more design flexibility.

FIG. 2 depicts a window presenting a conventional WINDOWS-like large icon view 30. A title bar 32, menu bar 34, button bar 36, main area 38 (containing the icons 16), and a status bar 40 are all included. However, the WINDOWS GUI is quite configurable, and FIGS. 2, 3a-b, and 4 emphasize that the search system 10 can adopt this configurable nature. FIG. 3a depicts a meta-folder 14 presenting a largely conventional WINDOWS-like details view 42. A columns bar 44 is additionally present, and various columns 46 appear with smaller representations of the icons 16 in the main area 38. The columns 46 here include the conventional ones for "Name," "Size," "Type," etc. Optionally, they may also include an additional location column 46a. In contrast, FIG. 3b depicts a meta-folder 14 also presenting a WINDOWS-like large icon view 30, but one omitting the button bar, as some WINDOWS-based applications do. FIG. 4 uses the WINDOWS-like large icon view 30.

FIGS. 2, 3a-b, and 4 also illustrate that the search system 10 may adopt the configurable icon arrangement feature of WINDOWS. In FIGS. 2 and 4 the icon 16a for the "My Old Notes" folder appears upper-left most in the main area 38. This is consistent with the way WINDOWS presents folders 22 ahead of files 24. FIGS. 2 and 4 further present the icons 16 in alphabetical label order.

The WINDOWS GUI, however, has some awkwardness which the search system 10 must overcome. WINDOWS does not handle identical labels well. In FIG. 2 one possible means of dealing with this is shown. While both the first search object 20a and the second search object 20b have the identical labels of "SalesSearch," the search system 10 has added pseudo-suffixes to distinguish them. For example, if a user created the first search object 20a and then latter dragged and dropped the second search object 20b from elsewhere into the same meta-folder 14, the search system 10 might then add the "A" pseudo suffix to the original instance of "SalesSearch" and add the "B" pseudo suffix to the newer instance.

In FIG. 3a another possible approach is shown, one using a non WINDOWS-like solution. In FIG. 3a the icon 16h and icon 16j have exactly the same labels. If a user wants to know more about one of these, he or she can look also to the additional location column 46a or use the WINDOWS properties feature to see the object's complete path.

FIG. 3b shows yet another possible means of dealing with label conflicts, but remaining largely true to the WINDOWS design metaphor. The icon 16k and the icon 16l both have the same label, but the icons 16 themselves have been made unique by adding "A" and "B" identifiers, much in the manner that WINDOWS modifies some icons to communicate extra information.

In many operating systems the configuration can be made specific to individual windows. Since the resolved meta-folder 14b of FIG. 4 is simply the unresolved meta-folder 14a of FIG. 2, FIG. 4 has the same configuration as FIG. 2. And while FIG. 3a-b have additionally been used as examples of how meta-folders 14 can alternately appear, it should be kept in mind that they are actually merely stylized representations of search objects 20. There is no requirement that the search objects 20 themselves control configuration. But such can be an option, much in the way WINDOWS sets a default window configuration that a user can override. It is anticipated that many embodiments of the search system 10 will use simple inheritance of a general configuration from the GUI and then minimally alter that as need. This is consistent with a key goal of the search system 10, which is that it be essentially seamless and transparent to users.

Accordingly, the contents (first search object 20a and second search object 20b) of FIG. 3a-b appear in the FIG. 4, but are presented in the manner which the resolved meta-folder 14b of FIG. 4 is configured for. Thus, the icon 16h and the icon 16j represent distinct conventional objects 18 having identical labels which have pseudo suffixes added. Similarly, the icon 16k and the icon 16l represent other distinct conventional objects 18 having identical labels, which here have also had pseudo-suffixes added to make them unique. Finally, FIG. 4 presents its contents in a sort order placing folders first and then further sorted alphabetically.

Within the WINDOWS design metaphor, creating meta-folders 14 and search objects 20 can be done easily and in a variety of possible ways. For example, the WINDOWS "Send To" command in the File menu may be used to select a new option for converting an existing conventional object 18 which is a folder 22 into a new meta-folder 14. Alternately or additionally, a new application can be used for this. A new search object 20 can then be created with the "New" command in the File menu for a meta-folder 14. Just as in most WINDOWS applets and in many applications designed for WINDOWS, this can be done using the menu bar 34 or using the mouse to right-click and bring up a menu of context sensitive options. Alternately or additionally, a new application can also be used for this. Alternately, the operation of opening a search object 20 which is not in a meta-folder 14 can automatically create a new meta-folder 14 containing just that search object 20.

The meta-folder 14 and search object 20 elements are so related that they can conceptually be considered variations of the same element in some embodiments. A meta-folder 14 is an open or un-encapsulated representation and a search object 20 is a closed or encapsulated representation. [As previously described, search objects 20 are collections of search criteria.] Taking this further, but keeping in mind that this is just one approach, and not a necessary one for implementing the search system 10, closing a meta-folder 14 can convert it into a search object 20 and opening a search object 20 can convert it into a meta-folder 14.

Before concluding with FIG. 2-4, it should be noted that FIG. 3b includes a cloud-shaped icon 16n. This represents what might happen if the first search object 20a of FIG. 3a were dragged and dropped into the meta-folder 14 representing the second search object 20b. In some embodiments, consistent with the general goals of seamlessness and transparency to the user, the first search object 20a would immediately attempt to resolve, and FIG. 3b would soon include all of the icons 16 which were previously in both FIG. 3a and FIG. 3b. That is to say that the search object 20b would then have search criteria of "*\Data\YTD'?? Sales.*; *\*\*'99 Sales.*; http://*DBServer.Acme.com/*'9?_Sales.html," wherein "*\Data\YTD'??Sales.*" is now part of a new search criteria for the second search object 20b. This is one manner in which search objects 20 can be modified or further constructed (after an initial creation).

Being limited to viewing transient unresolved meta-folders 14a (FIG. 2) and resolved meta-folders 14b (FIG. 4) may not always be desirable, and embodiments of the search system 10 may include a "View Unresolved" menu option. Such can be particularly useful for designing search objects 20 and for generally learning the search system 10 and diagnosing any problems.

Another possible menu option is a merge feature, to combine search objects 20, and optionally even specific conventional objects 18, into a single integrated search object 20. For example, the compound search criteria of "*\*\*'99 Sales.*" and "http://*DBServer.Acme.com/*'9?_Sales.html" used for second search object 20b could have been constructed by merging a search object 20 for "*\*\*'99 Sales.* with another search object 20 for "http://*DBServer.Acme.com/*'9?_Sales.html."

Figure 5:
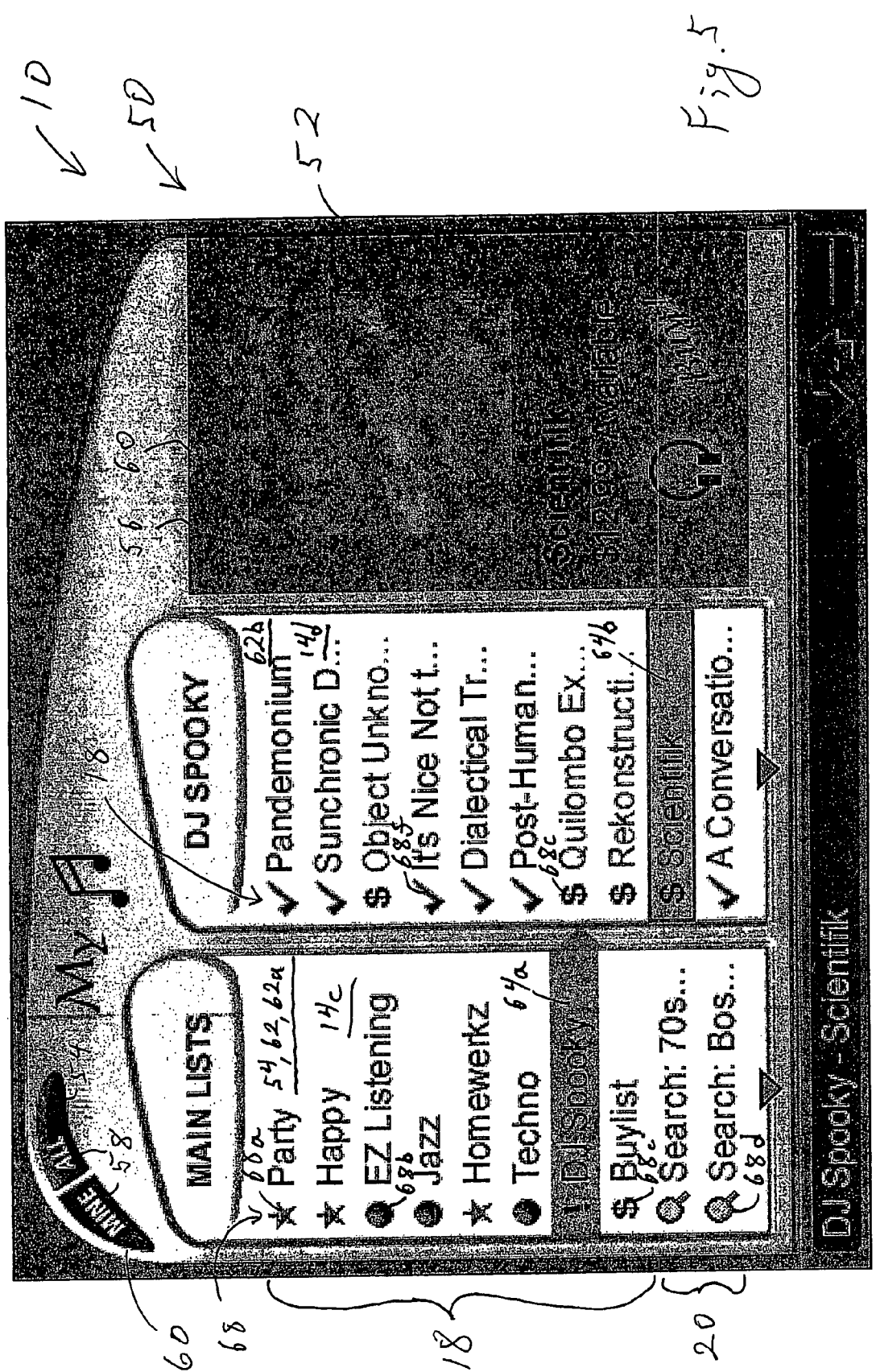
FIG. 5 stylistically depicts an alternate graphical user interface employing an alternate embodiment of the present invention.

FIG. 5 stylistically depicts the search system 10 integrated into a different graphical user interface (GUI 50), one on an enhanced device (not shown). The term "enhanced device" is, admittedly, an awkward one. Devices which are powerful, but which do not resemble traditional computer devices, are becoming increasingly common. Some present examples, without limitation, include devices for WebTV (trademark of Microsoft Corporation of Redmond, Wash.); personal digital assistant devices, e.g., PALM (trademark of 3COM Corporation of Santa Clara, Calif.); and web-access enabled portable telephones. One speculative additional example is communications enabled digital format music players, wherewith users could download digital music files (e.g., MP3 format) and play them as they exercise outdoors or travel in their automobiles. Herein we will collectively refer to all such non-traditional devices which employ some form of GUI as simply "enhanced devices."

A key point to be taken from FIG. 5 is that the search system 10 can be implemented in essentially any GUI where some form of search ability is desired, regardless of what the underlying hardware platform and operating system are. Thus, the GUI 50 here might appear on a largely television-like device and be controlled with a largely television-like remote user control unit.

Here a window 52 conceptually includes various controls 54 and images 56, but in actuality icons 58 depict the controls 54 and their states. One type of control 54 which is possible is a function choice unit 60. Here one is shown including the MINE and the alternate ALL selections in association. A user selects a respective icon 58 in such a function choice unit 60 and only the chosen function within a set of related functions becomes the one applied. Another possible type of control 54 is a list selection unit 62. Here a first list selection unit 62a is provided for "Main Lists" and includes a list of conventional objects 18 and search objects 20. This first list selection unit 62a is therefore a first meta-folder 14c. A second list selection unit 62b is further provided for "DJSpooky," and includes another list of conventional objects 18 (if additional search objects 20 are present in this representation they are already resolved and appear as conventional objects 18). The second list selection unit 62b thus may depict either a second meta-folder 14d (as shown here), or a conventional window as such may exist in the respective GUI 50.

As can be seen by the location of a first selection bar 64a, in FIG. 5 the search object 20 for "DJSpooky" in the first list selection unit 62a has been chosen. This "DJSpooky" search object 20 has also been opened (say, using an direction pad on a remote control device; the first selection bar 64a might change shade to depict this, but that would provide largely redundant information in this example). This causes the second list selection unit 62b or second meta-folder 14d to show a list of music album titles. In the second meta-folder 14d a second selection bar 64b is on the conventional object 18 titled "Scientifik", and a selection detail image 66 shows that the Scientifik album may be purchased for $12.99.

The first list selection unit 62a and the second list selection unit 62b here contain particular sub-icons 68. In the first list selection unit 62a, a star sub-icon 68a and a ball sub-icon 68b indicate, for example, particular classes of categorizations. For instance, the star sub-icon 68a might represent music play lists which the user has created and named, and the ball sub-icon 68b might represent system default categorizations. In the first list selection unit 62a these sub-icons 68 will usually be for conventional objects 18 which represent meta-objects (analogous to folders or directories in conventional computer GUIs) or for search objects 20, but there is no reason that conventional objects 18 which represent simple-objects (analogous to files in conventional computer GUIs) cannot also be present.

System defined sub-icons 68 can be included, and in this some examples are. A dollar sign sub-icon 68c indicates that its object may be purchased (and by implication has not already been purchased). For instance, the dollar sign sub-icon 68c here might be for a music play-list distributed by a reviewer who charges for his or her service. A magnifying glass sub-icon 68d indicates that its associated object is a search object 20. And an exclamation point sub-icon 68e indicates its object is the one which has been received by a friend, or contains items the user has marked to try out.

The sub-icons 68 in the second list selection unit 62b here include a check sub-icon 68f, indicating that the associated object is owned and freely available; and the dollar sign sub-icon 68c, again indicating that conventional objects 18 have not yet been obtained, and particularly that they have to be purchased. Here the second selection bar 64b is on a conventional object 18 having a dollar sign sub-icon 68c, and thus the selection detail image 66 shows that the "Scientifik" album may be purchased for $12.99.

The distinctive text in the list selection units 62 here optionally indicates which objects are presently "available." For example, a user may have physical copies of conventional objects 18 such as music compact discs (CDs) in their automobile, and thus want this reflected in some manner so that they do not accidentally purchase new copies. Or they may own a license to "use" only one instance of a conventional object 18 at a time, such as a downloaded MP3 music file, and they want it reflected in some manner that they have a purchased copy loaded elsewhere else, say, in their spouse's lap-top computer.

The underlying enabled device of FIG. 5 may work as follows, although this functionality is not actually germane to the present invention. Once the "Scientifik" album is purchased and loaded the selection detail image 66 can be replaced with a third list selection unit (not shown), wherein the user selects a particular song and opening it (say, by using an "Enter" key on a remote control device) causes the song to be played.

FIG. 5 also shows an intermingling of the user's own conventional objects 18 and search objects 20, with those of others. This intermingling can be based on fraternal association or commercial relationship, or some other arrangement. The search system 10 brings all of this together seamlessly.

FIG. 5 is based on a music file delivery example, but once the underlying concepts are appreciated, it is easily modified and extended to use with other media. For example, text lists may be entirely dispensed with and thumbnail-like sub-icons instead used to indicate general image-based genre in a first selection unit, thumbnail-like sub-icons showing image content in a second selection unit, and the actual full image shown in a selection detail image.

In summary, meta-folders 14 and search objects 20 can be created, stored, and transported. Users can trade them with one another and businesses and other entities can provide them for free or for some cost.

Figure 6:
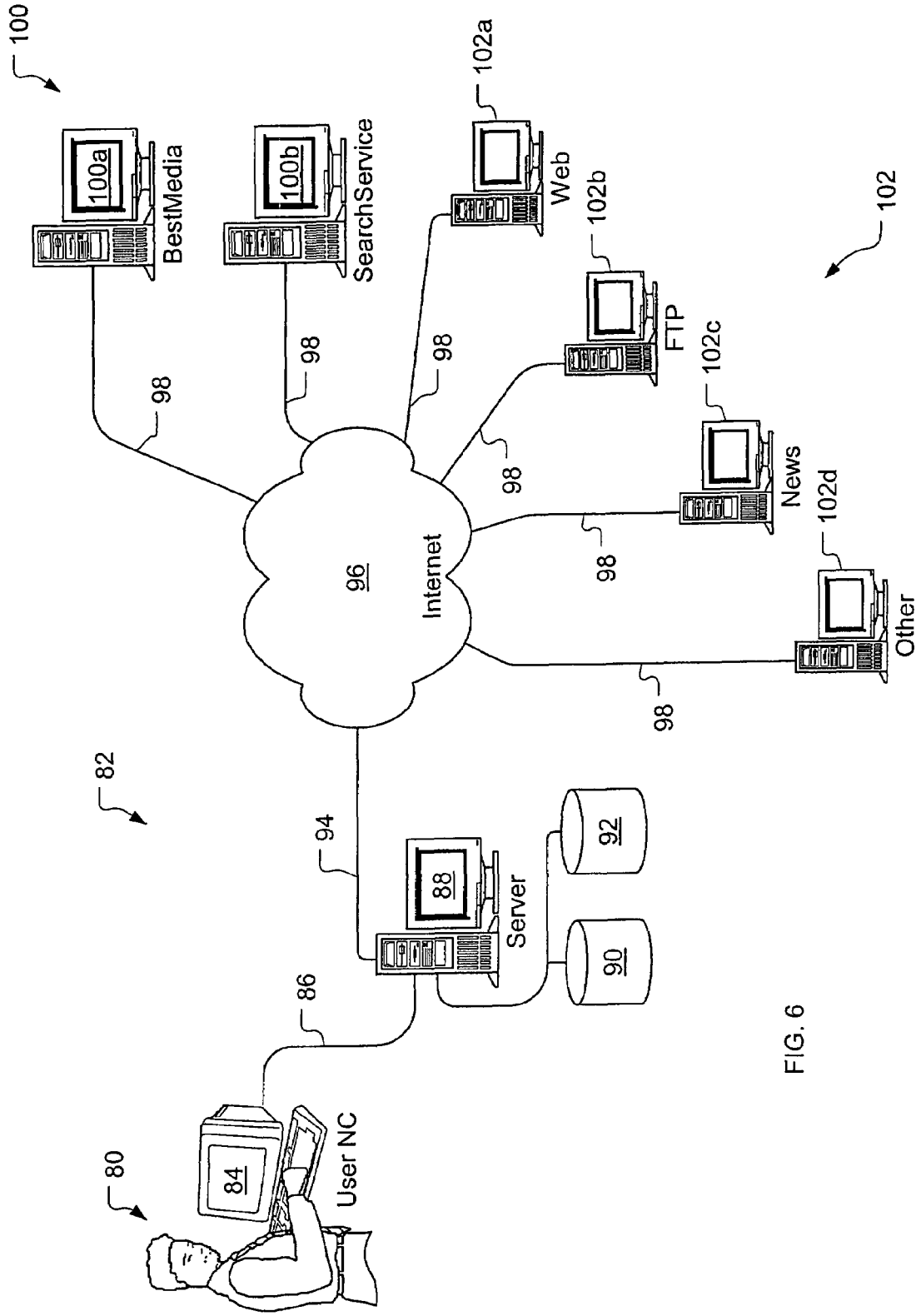
FIG. 6 is a block diagram depicting elements a user could employ in one scenario using the present invention in a large network environment.

FIG. 6 is a block diagram depicting elements a user 80 may use when employing the search system 10 in a larger network environment 82. Here a suitable network computer (NC 84) presents a GUI to the user 80. The NC 84 has no local storage resources, instead relying on a first network connection 86 to a user server 88. The user server 88 has traditional file storage 90, for files, folders and such; and also quasi-file storage 92, for objects such as e-mail, notes, contact or address book items, etc. The user server 88 may be on a local area network (LAN), or it may be on a wide are network (WAN), or it may even be operated by a business like an Internet Service Provider (ISP).

The term "quasi-files" is used here for a concept that is widely used today but not generally appreciated. Traditional files and folders are generally perceived by users as distinct objects, but they usually are just contents in a larger database being managed by an operating system. In contrast, e-mails and contact or address book items are usually perceived by users as being contents in some larger file. However, this is almost always an artificial distinction today, and in the context of searching generally, and the search system 10 specifically, it is an irrelevant one. For example, there is really very little that actually differs when the user 80 searches the traditional file storage 92 for e-mails meeting specific criteria, say, from a particular person or containing particular subject line contents, or when they search traditional file storage 90 for files with names meeting specific criteria or containing particular text.

The server in FIG. 6, in turn, has a second network connection 94, stylistically shown as entering a cloud representing the Internet 96. Various other network connections 98 then connect various other entities 100 to the Internet 96. The term "entities" is, admittedly, somewhat awkward but it serves well to convey the concept of a broad variety of possible devices and systems, perhaps comprising many sub-devices and sub-systems further within such.

Two particular such entities 100 are shown in FIG. 6. First, a vendor entity 100*a* is present and is labeled "BestMedia." For the example here, this is a vendor of books, video tapes, DVDs, CDs, audio cassettes, etc. Many traditional vendors of such media now market via the Internet. Second, a search entity 100*b* is present and is labeled "SearchService." Today many Internet sites specialize in providing powerful search services. Often these are still referred to as "search engines," but this is an awkward term which has poorly transitioned from when such search engines were single applications running in much simpler environments than today's WANs or the Internet.

The user 80 may employ the search system 10 for searching the vendor entity 100*a* by establishing at least one personality or profile. This can be done in various ways, including but not limited to requesting details, specifications, reviews, etc. or by purchasing one or more items. Or this can be done by explicitly specifying criteria for searching the vendor entity 100*a* (either the physical entity or via it as a portal to other resources).

In many respects the initial part of this step of profile building is already performed by some Internet sites today. For example, at least one MP3 music site requires a user to supply an e-mail address as a prerequisite for access, and then sends the user weekly e-mails containing suggestions based on what the individual user was interested in during recent visits or what other users with apparently similar interests have shown interest in. Similarly, some Internet based book sellers (more correctly, media sellers which started as book sellers) now present on-line shoppers with tailored web-pages including suggestions based on the users own recent visits or what others, of presumably like mind, have also purchased.

One major problem with such profiles, however, is that they fail to give the user 80, or some other person or organization which they trust, any direct control over this process. For example, if the user 80 is intellectually sophisticated and has wide ranging interests they may want to pursue materials on the Chinese legal system for their work one day, and materials on adopting a child on another day. Unfortunately, after the first day, when the user 80 enters the system they may get presented with suggestions for materials on the Mongolian legal system, and when they then enter a request about adoption they may get back suggestions on Chinese adoption law.

A simple "solution" to this problem, but unfortunately one which such preference-based sites fail to provide so far, is a true capability to selectively wipe out parts of a past search history, and sometimes to just wipe out an established profile or request a completely new search. Thus, for instance, if in an intervening period the spouse of the user 80 has used the same NC 84 and logon account to search regarding Navaho pottery, and if the user 80 later decides that they do want to pursue Mongolian materials, say on the influence of Genghis Khan on the modern Chinese legal system, the user 80 may find this at least difficult because of the influence of the intervening preference data on pottery entered by their spouse.

The search system 10 provides a solution to this. The user 80 can directly create multiple personalities or profile sets by means of meta-folders 14 and search objects 20 (FIG. 2-5). Or an empty meta-folder 14 can seamlessly be created and then automatically populated with search objects 20 based on usage analysis, i.e., essentially an extended form of current personality or preference profiling. Or the vendor entity 100*a* can do this. Or the user 80 can obtain meta-folders 14 and search objects 20 from others. For instance, the user 80 may delegate doing basic research on Chinese history to a subordinate, and then receive a meta-folder 14 as that subordinate's work product. Or the user 80 may get pre-packaged meta-folders 14 with various search objects 20 from Internet sites, or out of CD media encyclopedias.

The user 80 may review the initial efforts and add some new search objects 20 for outside influences on the Chinese legal system. Or they may review the adoption site's information and decide to eliminate a search object 20 for adoption contacts in Maine because they live in California. Or they may review a second adoption site, obtain a meta-folder 14 from it, and upon opening it decide that it should be dragged and dropped into the first site's meta-folder 14 to act as a search object 20 contributing to a new, mega meta-folder 14. The search system 10, via its meta-folders 14 and search objects 20, provides these powerful capabilities.

The search system 10 also provides this in a very flexible manner in the overall network environment 82. The NC 84 here cannot store the meta-folders 14 and search objects 20, but it easily could if it instead were a PC. The meta-folders 14 and search objects 20 can easily be stored in the traditional file storage 90 on the user server 88, or elsewhere. For example, the meta-folders 14 and search objects 20 can be stored by the vendor entity 100*a*, but many such entities probably will not want to be bothered with this. A more likely overall scenario is that such entities will accumulate search objects 20 into meta-folders 14 for a short period of time, essentially while the user 80 is still active, and then give the user 80 the option to retrieve the meta-folder 14 or let it be disposed of. The user 80 can then store the meta-folder 14 wherever they desire, maybe even just e-mailing it onward to somebody else immediately FIG. 6 also shows elements of an example of how the user 80 may employ the search system 10 for searching the search entity 100*b*. A number of content servers 102 are also connected to the Internet 96, and include a web-page server 102*a*, an FTP server 102*b*, a news server 102*c*, and an other server 102*d*. These are all mere representative examples, and those skilled in the electronic communications arts will readily appreciate that many such servers are today already connected to the Internet 96.

The user 80 may include conventional, URL based search criteria in search objects 20 (as was done in the example in FIG. 2-4). When the user 80 opens the meta-folder 14 containing these search objects 20, searching automatically ensues as the meta-folder 14 resolves. Alternately, the search entity 100*b* can provide empty meta-folders 14, much like on-line vendors provide pseudo shopping-carts. The user 80 can then drag and drop or click to add search objects 20 to the meta-folder 14. These search objects 20 can be from stock sets provided by the current search entity 100*b*, or even from another search entity entirely. The user 80 can put search objects 20 they create themselves, or have received from others, into the meta-folder 14, much like files are easily attached to e-mails today.

This process can also occur, if desired, at a highly visual level. As one such visual feature, display icons for unopened meta-folders 14 may change to reflect the attributes or characteristics of the actual or projected contents. They might thus show the quantity of search objects 20 included, or estimates of the quantity of "hits" those search objects 20 will produce. If dragging and dropping a particular search object 20 causes an icon to turn red or swell up, for example, these might be warnings to the user 80 that this search object 20 will produce roughly 800 hits or 400 MB of material. A substantially conventional GUI undo function could then be used to remove that search object 20, or the user 80 can see that they may want to drag and drop a search narrowing search object 20 into the meta-folder 14 as well.

When the user 80 is has a particular meta-folder 14 thus created, they can open it and resolve it. For example, they may have loaded search objects 20 for general adoption service web-sites; ftp copies of adoption related statues under California state law; and news groups on adoption topics, but further filtered to obtain only message threads discussing concurrently adopting siblings.

Or, when the user 80 is done with a meta-folder 14 thus created, they can save it or delete it. As briefly touched upon above, in a network environment 82 where electronic connectivity is needed and physical proximity is not, just where a meta-folder 14 gets stored becomes largely irrelevant. If the user 80 has storage at the vendor entity 100*a*, for instance, they may move today's meta-folder 14 of work effort on modern China's legal system into an unopened meta-folder 14 there. Tomorrow they can add a different meta-folder 14 of work effort, say, on ancient Mongolia's legal system. And then they could open up the resulting meta-folder 14 on the vendor entity 100*a*, containing these two objects which started as meta-folders 14 at the search entity 100*b* but now are search objects 20 at the vendor entity 100*a*. This may thus lead to showing the user 80 information and pricing on books and documentary videos which can be ordered on the subject of ancient Mongolia's influence on the law of modern China.

Discussion now turns to applying the search system 10 in emerging user interfaces (XUIs). No figure accompanies this discussion, since XUIs may be largely, even exclusively, non-visual in nature. In an XUI a "display" may be more then or even entirely other than visual. Both audio and tactile XUIs may beneficially employ the search system 10. As a simple example, which is useful even though highly stereotypical, a tactile XUI can employ Braille-like "icons" for meta-folders 14 which "open" into physical "windows" and resolve into Braille-like "icons" in turn representing conventional objects 18. As another example, a tactile XUI might employ musical chords or short sound sequences to represent meta-folders 14 which resolve into conventional objects 18 in the form of music selections ("files" being again highly stereotyping) in a particular genre (say, based on a search by that genre); or based on a friend's suggestion (perhaps with the audible icon for the meta-folder 14 including the friend's voice).

As can be appreciated, the search system 10 has very broad application and its scope should not be restrictively interpreted in view of the necessarily limited number and the inherently limited nature of the examples which are being used herein.

In addition to the above mentioned examples, various other modifications and alterations of the search system 10 may be made without departing from the invention. Accordingly, the above disclosure is not to be considered as limiting and the appended claims are to be interpreted as encompassing the true spirit and the entire scope of the present invention.

INDUSTRIAL APPLICABILITY

The present search system 10 is well suited for application in existing and in anticipated future systems employing graphical and other user interfaces (GUI, and XUI) and having a need for search capabilities. This has been shown by example herein with respect to the currently most widely used such GUI, WINDOWS (trademark of Microsoft Corporation of Redmond, Wash.). This has been shown by example herein with respect to one enhanced device type GUI. Enhanced devices are becoming increasingly common, with WebTV (trademark of Microsoft Corporation of Redmond, Wash.) and PALM (trademark of 3COM Corporation of Santa Clara, Calif.), MP3 players, and web-access enabled portable telephone type devices currently available, and many others currently in development.

As our society increasingly comes to rely on complicated electronic systems, and particularly on such systems which have the ability to inter communicate, finding specific objects within these systems is a daunting task. The search system 10 reduces or eliminates many problems associated with searching for objects including folders, files, data, etc. Such objects may be used for storing text, audio, or video information; or for computer files, e-mails, news messages, configuration profiles, etc.; or still other electronically storable and communicate able objects. The search system 10 reduces or eliminates many problems associated with searching as we move increasingly away from the traditional file and folder metaphor. This is rapidly occurring in the context of e-commerce, where product searches, and categorical personality or profile tracking are already widely used. While the label "meta-folder" has been used herein, it should be appreciated that this element, and the search system 10 as a whole, are not limited to such traditional contexts. In fact, greatest acceptance of the search system 10 is anticipated by the inventor to be in e-commerce applications.

The search system 10 may be currently implemented in existing and emerging GUIs, as has been shown by the particular examples used herein, and as has also been described herein. Accordingly, the search system 10 requires no particular tools and skills which are not available and widely understood today, and the search system 10 are immediately obtainable.

For the above, and other, reasons, it is expected that the search system 10 of the present invention will have widespread industrial applicability. Therefore, it is expected that the commercial utility of the present invention will be extensive and long lasting.

What is claimed is:

1. A computer readable storage medium storing instructions that when executed by a computer system connected to a network are capable of causing the computer system to:
   define a meta-folder as a type of graphical element, wherein an instantiation of the meta-folder graphical element type is associable with 1) one or more search objects having corresponding search criteria and 2) one or more conventional objects that are unrelated to the search criteria;
   display, via a first graphical interface of the computer system, a first graphical representation of a first meta-folder instantiated on the computer system, wherein the first meta-folder statically points to at least one conventional object that is unrelated to the corresponding search criteria for the first meta-folder;
   upon selection of the first graphical representation via the first graphical interface:
      for any search objects associated with the first meta-folder, initiate searching the computer system and the network for conventional objects that satisfy the corresponding search criteria; and
      display, via the first graphical interface, a second graphical representation of the first meta-folder that includes graphical elements representing 1) any conventional objects located as a result of the searching and 2) the at least one conventional object statically pointed to by the first meta-folder.

2. The computer readable storage medium of claim 1, wherein the network includes a local area network.

3. The computer readable storage medium of claim 1, wherein the network includes a wide area network.

4. The computer readable storage medium of claim 1, wherein the network includes the Internet.

5. The computer readable storage medium of claim 1, wherein the network includes a local area network, a wide area network or the Internet and the network includes a collection of storage systems for storing at least some of the conventional objects located as a result of the searching.

6. The computer readable storage medium of claim 1, wherein the network includes a local area network and a wide area network.

7. The computer readable storage medium of claim 1, wherein the network includes a local area network and the Internet.

8. The computer readable storage medium of claim 1, wherein the network includes a wide area network and the Internet.

9. The computer readable storage medium of claim 1, wherein the network includes a local area network, a wide area network and the Internet.

10. The computer readable storage medium of claim 1, wherein the network includes a user server connected to the computer system.

11. The computer readable storage medium of claim 10, wherein the user server stores the first meta-folder.

12. The computer readable storage medium of claim 11, wherein the user server stores at least some of the conventional objects located as a result of the searching.

13. The computer readable storage medium-of claim 10, wherein the user server is connected to the computer system via a local area network.

14. The computer readable storage medium of claim 10, wherein the user server is connected to the computer system via a wide area network.

15. The computer readable storage medium of claim 10, wherein the user server is connected to the computer system via the Internet.

16. The computer readable storage medium of claim 10, wherein the user server is connected to a content server via the Internet.

17. The computer readable storage medium of claim 16, wherein the content server is a web-page server, an FTP server or a news server.

18. The computer readable storage medium of claim 10, wherein the user server is connected to a vendor server via the Internet.

19. The computer readable storage medium of claim 18, wherein the first meta-folder is stored on the vendor server or the user server.

20. The computer readable storage medium of claim 18, wherein the vendor server includes a search engine or media products.

21. The computer readable storage medium of claim 18, wherein the vendor server includes media products including books, video tapes, DVDs, CDs and audio cassettes.

22. The computer readable storage medium of claim 1, wherein the instructions are further capable of causing the computer system to initiate a transfer of the first meta-folder via the network.

23. The computer readable storage medium of claim 22, wherein the transfer occurs through electronic mail.

24. The computer readable storage medium of claim 1, wherein conventional objects include conventional folders, conventional files, electronic mail, notes, contact or address book items, or files containing text, audio or video information.

25. The computer readable storage medium of claim 1, wherein the search criteria include wildcard characters.

26. The computer readable storage medium of claim 1, wherein the first meta-folder includes descriptive text.

27. The computer readable storage medium of claim 26, wherein the descriptive text describes the search criteria.

28. The computer readable storage medium of claim 1, wherein the instructions are further capable of causing the computer system to display the second graphical representation of the first meta-folder on a single screen of the user interface.

29. The computer readable storage medium of claim 1, wherein the first meta-folder includes associated objects that correspond to music files.

30. The computer readable storage medium of claim 29, wherein the instructions are further capable of causing the computer system to initiate playing the music files.

31. The computer readable storage medium of claim 29, wherein the instructions are further capable of causing the computer system to generate graphical representations that indicate whether the music files are owned or un-owned.

32. The computer readable storage medium of claim 29, wherein the instructions are further capable of causing the computer system to initiate a purchase of one or more of the music files.

33. The computer readable storage medium of claim 29, wherein the instructions are further capable of causing the computer system to provide a link from which the user can purchase the music.

34. The computer readable storage medium of claim 1,
wherein any conventional objects that have been associated with the first meta-folder have been associated by being moved into the first meta-folder in response to input received via the first graphical interface; and
wherein the graphical elements representing 1) any conventional objects located as a result of the searching and 2) the at least one conventional object statically pointed to by the first meta-folder are movable out of the first meta-folder in response to input received via the first graphical interface.

35. A computer readable storage medium storing instructions that when executed by a computer system connected to a network are capable of causing the computer system to:
define a meta-folder graphical element type on the computer system, wherein the meta-folder graphical element type permits the association of 1) one or more search objects having corresponding search criteria and 2) one or more conventional objects unrelated to the search criteria with an instantiation of the meta-folder graphical element type on the computer system;
display, via a first graphical interface of the computer system, a first graphical representation of a first meta-folder instantiated on the computer system;
upon selection of the first graphical representation of the first meta-folder via the first graphical interface:
initiate searching the computer system, a local area network, and the Internet for conventional objects that satisfy the search criteria for any search objects associated with the first meta-folder; and
display, via the first graphical interface, a second graphical representation of the first meta-folder that includes graphical elements representing 1) conventional objects located as a result of the searching and 2) any conventional objects otherwise associated with the first meta-folder, including at least one conventional object unrelated to the search criteria corresponding to the first meta-folder, wherein the first meta-folder statically points to the at least one conventional object.

36. The computer readable storage medium of claim 35, wherein the instructions are further capable of causing the computer system to display the graphical elements representing the conventional objects located as a result of the searching and the conventional objects otherwise associated with the first meta-folder in an intermingling manner within the second graphical representation of the first meta-folder.

37. The computer readable storage medium of claim 35,
wherein any conventional objects that have been associated with the first meta-folder have been associated by being moved into the first meta-folder in response to input received via the first graphical interface; and
wherein the graphical elements representing 1) any conventional objects located as a result of the searching and 2) any conventional objects otherwise associated with the first meta-folder are movable out of the first meta-folder in response to input received via the first graphical interface.

38. The computer readable storage medium of claim 35, wherein the instructions are further capable of causing the computer system to initiate a transfer of the first meta-folder via the network.

39. An apparatus comprising:
a processor;
a memory storing program instructions that are computer executable by the processor to:
cause the display of a first meta-folder associated with a first search object, wherein a meta-folder is a graphical element type associable with search objects and conventional objects, each search object having corresponding search criteria;
receive a command to open the first meta-folder;
in response to receiving the command to open the first meta-folder:
initiate searching the network and the apparatus for conventional objects that satisfy the search criteria corresponding to search objects in the first meta-folder, including search criteria corresponding to the first search object; and
cause the display of graphical representations of the conventional objects that result from the searching and any conventional objects otherwise associated with the first meta-folder, including at least one conventional object that the first meta-folder statically points to, wherein the at least one conventional object is unrelated to the corresponding search criteria of the first search object.

40. The apparatus of claim 39, wherein the apparatus is a personal digital assistant.

41. The apparatus of claim 40, wherein the program instructions are further executable to cause the personal digital assistant to display, within the displayed first meta-folder, the graphical representations of the conventional objects that result from the searching and the graphical representations of conventional objects otherwise associated with the first meta-folder in an intermingling manner on a user interface of the personal digital assistant.

42. The apparatus of claim 39, wherein the apparatus is a web-access enabled portable telephone.

43. The apparatus of claim 42, wherein the program instructions are further executable to cause the web-access enabled portable telephone to display, within the displayed first meta-folder, the graphical representations of the conventional objects that result from the searching and the graphical representations of conventional objects otherwise associated with the first meta-folder in an intermingling manner on a user interface of the portable telephone.

44. The apparatus of claim 39, wherein the apparatus is an audio player.

45. The apparatus of claim 44, wherein the program instructions are further executable to cause the audio player to display, within the displayed first meta-folder, the graphical representations of the conventional objects that result from the searching and the graphical representations of conventional objects otherwise associated with the first meta-folder in an intermingling manner on a user interface of the audio player.

46. The apparatus of claim 39,
wherein any conventional objects that have been associated with the first meta-folder have been associated by being moved into the first meta-folder in response to received input; and
wherein 1) the graphical representations representing any conventional objects located as a result of the searching and 2) graphical representations representing any conventional objects otherwise associated with the first meta-folder are movable out of the first meta-folder in response to received input.

47. The apparatus of claim 39, wherein the program instructions are further executable to initiate a transfer of the first meta-folder via the network.

48. A computer readable storage medium storing instructions that when executed by a computer system are capable of causing the computer system to:
display at least one meta-folder, wherein the meta-folder is a graphical element type that permits association with objects including search objects having corresponding search criteria upon opening the meta-folder;
search for conventional objects that satisfy the search criteria; and
display conventional objects resulting from the search; and
display together with the conventional objects resulting from the search at least one conventional object to which the meta-folder statically points, wherein the at least one conventional object is unrelated to the search.

49. The computer readable storage medium of claim 48, wherein the instructions permit representations of search objects and the at least one conventional objects to be dragged and dropped into and out of the meta-folder.

50. The computer readable storage medium of claim 48, wherein the instructions are further capable of causing the computer system to initiate a transfer of the meta-folder via a network coupled to the computer system.

51. A system comprising:
a processor;
a memory;
a display unit;
wherein the memory stores program instructions executable by the processor to:
cause the display of a representation of an instantiation of a first graphical element type associated with a search object and a first set of conventional objects; wherein the search object has corresponding search criteria, and wherein the first set of conventional objects are unrelated to the search criteria, and wherein the first set of conventional objects includes at least one conventional object to which the instantiation of the first graphical element type statically points;
upon selection of the instantiation of the first graphical element type:
initiate resolution of the search object by searching for conventional objects that satisfy the search criteria; and
cause icons representing the first set of conventional objects along with icons representing the conventional objects that satisfy the search criteria to be displayed within the representation of the instantiation of the first graphical element type.

52. The system of claim 51,
wherein the first set of conventional objects have been associated by being moved into the instantiation in response to received input; and
wherein the icons representing the first set of conventional objects and any conventional objects located as a result of the searching are movable out of the instantiation in response to user input.

53. The system of claim 51, wherein the program instructions are further executable by the processor to transfer the instantiation of the first graphical element type via a network coupled to the system.

54. A method, comprising:
causing a representation of a meta-folder to be displayed by a device, wherein the meta-folder is an instantiation of a graphical element type and is associated with one or more search objects and one or more conventional objects that are not related to the one or more search objects, including at least one conventional object to which the meta-folder statically points, wherein the one or more search objects have corresponding search criteria;
receiving a command to open the meta-folder;
in response to receiving the command to open the meta-folder:
initiating searching the device and a network coupled to the device for conventional objects that satisfy the search criteria corresponding to the one or more search objects; and
causing the display of icons representing the conventional objects that result from the searching and the one or more conventional objects that are associated with the meta-folder but that are not related to the one or more search objects.

55. The method of claim 54, wherein the network includes a local area network, a wide area network or the Internet and the network includes a collection of storage systems storing one or more conventional objects.

56. The method of claim 54, further comprising transferring the meta-folder via the network.

57. The method of claim 56, wherein the transfer occurs through electronic mail.

58. The method of claim 54, wherein the conventional objects that result from the searching include conventional folders, conventional files, electronic mail, notes, contact or address book items or files containing text, audio or video information.

59. The method of claim 54,
wherein the one or more conventional objects that are not related to the one or more search objects have been associated with the meta-folder by being moved into the first meta-folder in response to input received via a first graphical interface; and
wherein 1) the icons representing the conventional objects that result from the searching and 2) the icons representing the one or more conventional objects that are not related to the one or more search objects are movable out of the meta-folder in response to user input.

60. The method of claim 54, further comprising transferring the first meta-folder from the device to another device via the network.

* * * * *